United States Patent
Moriarty, Jr.

(10) Patent No.: US 8,004,122 B2
(45) Date of Patent: Aug. 23, 2011

(54) BOOTSTRAP SUPPLY FOR SWITCHED MODE POWER CONVERTER

(75) Inventor: John K. Moriarty, Jr., Reading, PA (US)

(73) Assignee: Zarlink Semiconductor (U.S.) Inc., Austin, TX (US)

( * ) Notice: Subject to any disclaimer, the term of this patent is extended or adjusted under 35 U.S.C. 154(b) by 459 days.

(21) Appl. No.: 12/190,907

(22) Filed: Aug. 13, 2008

(65) Prior Publication Data
US 2010/0039083 A1    Feb. 18, 2010

(51) Int. Cl.
*H02M 1/00*    (2007.01)
(52) U.S. Cl. .................. 307/125; 323/282; 318/814
(58) Field of Classification Search ............ 307/43, 307/64–66, 82, 86, 112, 115, 106, 108, 39; 327/100, 104, 362, 379, 390, 540, 549, 551, 327/594; 363/40, 44, 45, 55, 56.01–56.05, 363/98; 361/89, 90, 91, 93.01; 324/764–765
See application file for complete search history.

(56) References Cited

U.S. PATENT DOCUMENTS

| | | | | |
|---|---|---|---|---|
| 5,811,963 | A | 9/1998 | Elwell ............................ | 323/318 |
| 6,370,046 | B1 * | 4/2002 | Nebrigic et al. ................ | 363/60 |
| 6,459,174 | B1 * | 10/2002 | Marino ......................... | 307/125 |
| 6,859,021 | B2 | 2/2005 | Link .............................. | 323/284 |
| 7,433,165 | B2 * | 10/2008 | Carter et al. .................... | 361/54 |

FOREIGN PATENT DOCUMENTS

| | | |
|---|---|---|
| DE | 198 07 517 A1 | 8/1999 |
| DE | 201 09 957 U1 | 8/2002 |
| EP | 0 709 950 A2 | 10/1995 |
| WO | WO 02/43244 A1 | 5/2002 |

OTHER PUBLICATIONS

PCT Search Report and Written Opinion from PCT/US2009/050691 dated Oct. 13, 2009.
HV-2405E World-Wide Single Chip Power Supply, Harris Semiconductor, Apr. 1994.

* cited by examiner

*Primary Examiner* — Rajnikant B Patel
(74) *Attorney, Agent, or Firm* — Williams, Morgan & Amerson, P.C.

(57) ABSTRACT

A power converter controller is operable to control power provided to a load circuit coupled between a first voltage supply terminal and a first switching element by controlling the first switching element and to control power provided to an energy storage element coupled to the first switching element. The energy storage element is operable to provide a power supply. A first control terminal couples to a control input of the first switching element. A first load terminal couples to the first switching element and the charge storing element. A second switching element couples between the first load terminal and a second voltage supply terminal. Timing logic is operable to selectively provide a control signal at the first control terminal to control the first switching element and to selectively control the second switching element to supply power to the load circuit during a load powering phase by enabling the first and second switching elements, charge the energy storage element during a bootstrap charging phase by enabling the first switching element and disabling the second switching element, and allowing the load circuit to operate in isolation during a passive phase by disabling at least the first switching element.

32 Claims, 7 Drawing Sheets

BOOTSTRAP SUPPLY FOR SWITCHED MODE POWER CONVERTER

CROSS-REFERENCE TO RELATED APPLICATIONS

Not applicable.

BACKGROUND OF THE INVENTION

The disclosed subject matter relates generally to manufacturing and, more particularly, to a bootstrap supply for a switched mode power converter.

Switched mode power converters are widely used to provide voltage, current, or power controlled power sources for various loads. For example, a power converter may control output voltage thereby acting as a voltage regulator that converts an input voltage to a desired output voltage. A power converter may also provide a constant current source to power a load, such as a light emitting diode (LED) array.

Typical off-line switched mode power converters (i.e., powered from AC mains) include a high voltage supply that is routed through a load circuit by means of a switch or switches. The load circuit includes one or more dissipative elements, and may include inductive elements that store energy for later delivery to the dissipative elements within the load circuit. A typical load circuit may include one or more resistors, diodes, light emitting diodes (LEDs), capacitors, inductors, transformers, terminal connections, switches, etc., and/or various active circuits, etc. A switching transistor is coupled between the load circuit and a high voltage supply terminal for controlling the amount of energy supplied thereto. When the load circuit is coupled across the high voltage supply, power is supplied to the load circuit. When the load circuit is uncoupled from across the high voltage supply by the switching transistor, the load circuit operates in isolation from the high voltage supply. If the load circuit contains an inductive element, then the inductive element may supply power to the dissipative elements while the load circuit is isolated from the high voltage supply. A load feedback parameter (e.g., voltage, current, or power) is often monitored to determine the load requirements. The duty cycle of the switching transistor is controlled to meet the load requirements, the duty cycle representing the fraction of the main power conversion switching cycle in which power is supplied to the load circuit.

Figure 6A:
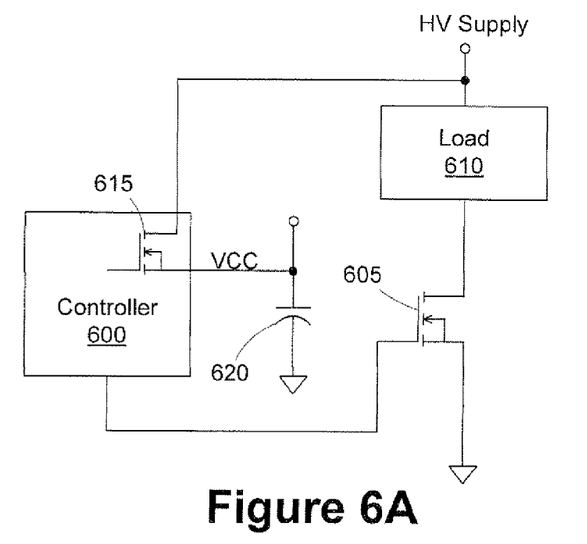
FIGS. 6A-6C are circuit diagrams of prior art power converters.

The control circuitry of a high voltage power converter often requires a supply voltage that is lower in magnitude than the high voltage supply. Simple regulators have been employed that derive the low voltage supply from the high voltage AC mains using a dissipative series element, such as in the circuit of FIG. 6A. A controller 600 controls a first transistor 605 for powering a load 610 and a second transistor 615 for charging a capacitor 620 that provides the control voltage, VCC. The arrangement of FIG. 6A wastes an appreciable amount of power, reducing the efficiency of the power converter. For example, for a power converter controller operating from a peak-detecting bridge on 220V European mains, the high voltage supply can approach 360V. The power converter may draw over 10 mA while driving the gate of the switching transistor at high switching frequencies, so the power wasted can exceed 3.6 W (i.e., 10 mA×360V).

Figure 6B:
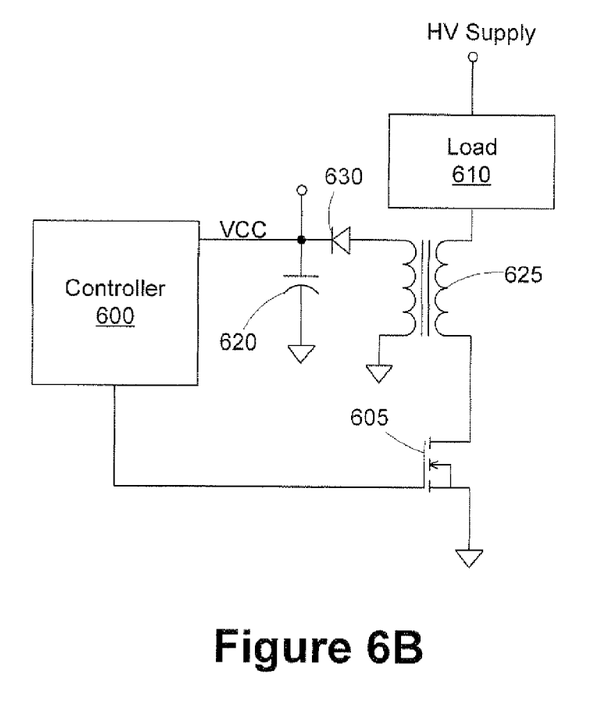

To avoid this efficiency loss, other techniques have been employed to generate the control voltage supply by using a more efficient, auxiliary switch mode power supply. For example, as shown in FIG. 6B, a winding can be added to a magnetic element 625 in the main switched mode power converter circuitry thereby creating a parasitic transformer secondary from which a low voltage supply can be generated using the capacitor 620 and a diode 630. However, this approach complicates the construction of the magnetic element, and often precludes the use of off-the-shelf magnetic components, resulting in increased cost. Furthermore, since the auxiliary supply is crudely derived from the main power converter, the precision of the low voltage supply is decreased. When the low voltage supply is higher than necessary, power is wasted.

Figure 6C:
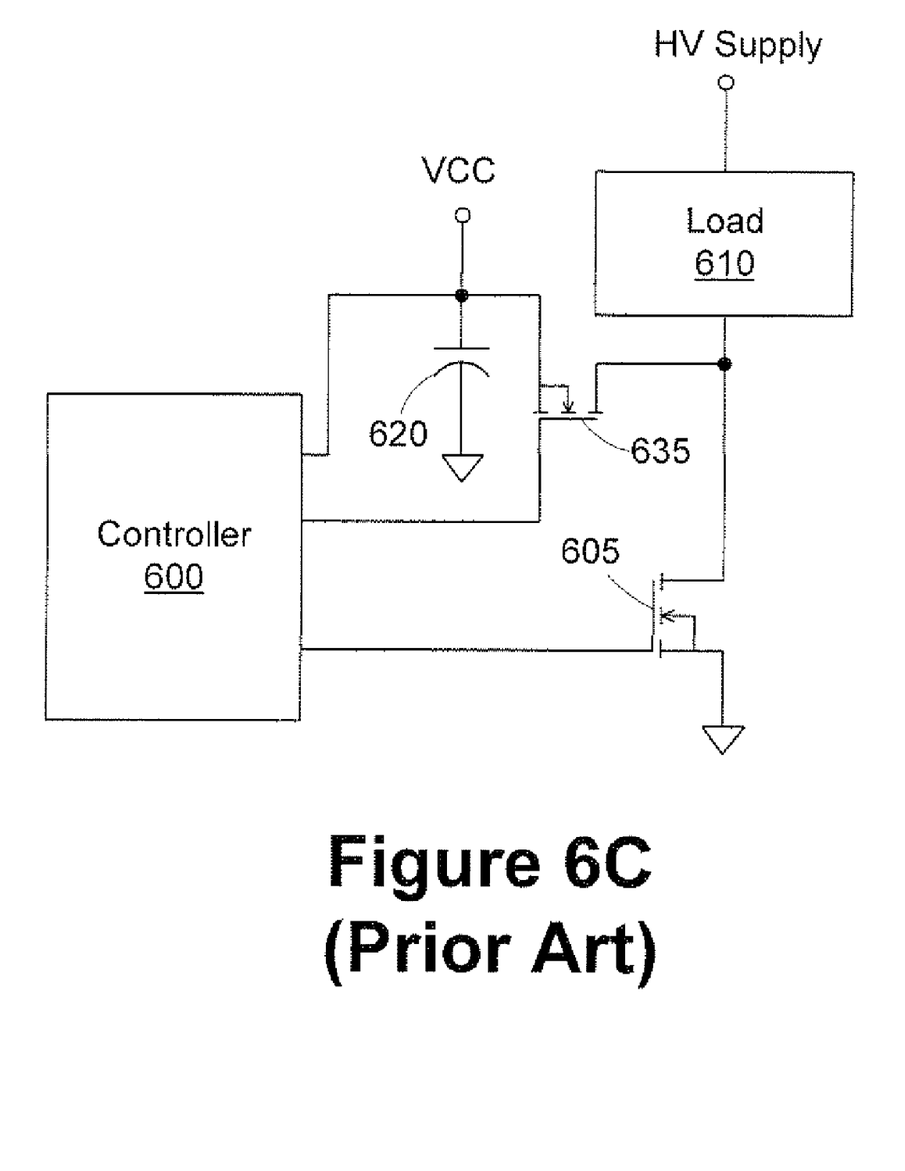

Another technique employed to generate the control voltage supply involves the use of a high-voltage switching element 635 connected between the switched terminal of the load 610 and the capacitor 620, as shown in FIG. 6C. This technique avoids significant efficiency loss, but it increases cost by requiring an additional high-voltage transistor and associated control circuitry. High-voltage transistors are far more costly than low-voltage transistors. Furthermore, high-voltage transistors are far more difficult to integrate within a monolithic integrated circuit than low voltage transistors.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF THE INVENTION

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a power converter controller operable to control power provided to a load circuit coupled between a first voltage supply terminal and a first switching element by controlling the first switching element and to control power provided to an energy storage element coupled to the first switching element. The energy storage element is operable to provide a power supply. A first control terminal couples to a control input of the first switching element. A first load terminal couples to the first switching element and the charge storing element. A second switching element couples between the first load terminal and a second voltage supply terminal. Timing logic is operable to selectively provide a control signal at the first control terminal to control the first switching element and to selectively control the second switching element to supply power to the load circuit during a load powering phase by enabling the first and second switching elements, charge the energy storage element during a bootstrap charging phase by enabling the first switching element and disabling the second switching element, and allowing the load circuit to operate in isolation during a passive phase by disabling at least the first switching element.

Another aspect of the disclosed subject matter is seen in a method that includes providing a power converter. The power converter includes an inductive storage element coupled to a first voltage supply terminal and a capacitive storage element capable of being coupled to the inductive storage element and being operable to provide a control voltage source to the power converter. The inductive storage element is coupled to a second power supply terminal to store energy in the inductive storage element during a load charging cycle of the power converter. The capacitive storage element is coupled to the inductive storage element to transfer energy from the inductive storage element to the capacitive storage element during a bootstrap charging cycle of the power converter. The inductive storage element is isolated from the second power supply terminal to transfer energy stored from the inductive storage element to a load coupled to the power converter during a load delivery cycle.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION OF THE INVENTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
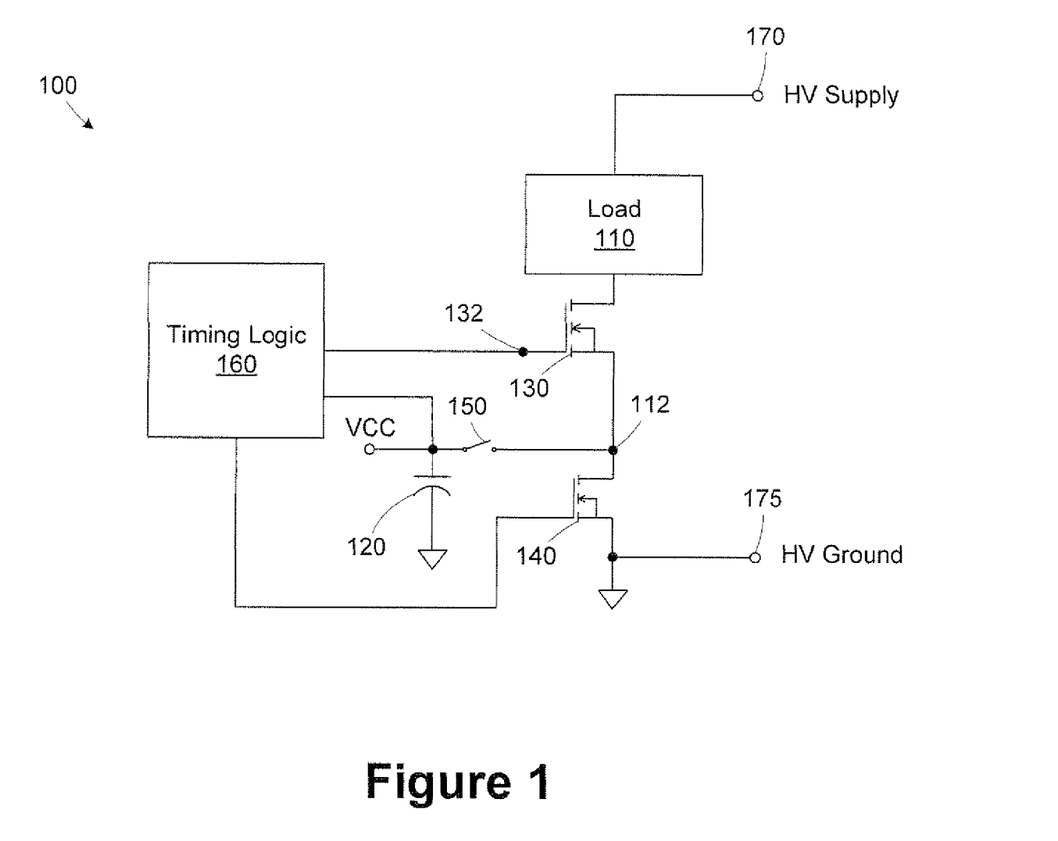
FIG. 1 is a circuit diagram of a power converter in accordance with one illustrative embodiment of the present invention.

Referring now to the drawings wherein like reference numbers correspond to similar components throughout the several views and, specifically, referring to FIG. 1, the disclosed subject matter shall be described in the context of a power converter 100. The power converter 100 couples to a load circuit 110 and an energy storage element 120 at a load terminal 122 and to a control input of a first switching element 130 at a control terminal 132. The power converter 100 includes switching elements 140, 150, and timing logic 160. The energy storage element 120 serves as an energy storage device for providing a power supply for the power converter 100. Typically, the first switching element 130 and the energy storage element 120 are installed by a customer and connected to the terminals 122, 132 of a power converter device that includes the switching elements 140, 150 and the timing logic 160. When the term "coupling" is used herein, coupling represents the establishment of an electrical current path either by direct connection or through a coupling element or combination of coupling elements, e.g., a resistor or switch.

The circuit elements in the power converter 100 may take various forms, as further illustrated below. In the illustrated embodiment, the switching elements 130, 140 may be transistors, while the switching element 150 may be a transistor or a diode. The load circuit 110 may include one or more resistors, diodes, light emitting diodes (LEDs), capacitors, inductors, transformers, terminal connections, switches, and/or various active circuits, etc., and the energy storage element 120 may be a capacitor or a battery. Of course, other types of elements may be used to accomplish the functions described herein, and the subject matter is not limited to the specific circuit elements shown or listed above.

The timing logic 160 controls the switching elements 130, 140, 150 to selectively supply power to the load circuit 110 and add energy (i.e., charge) to the energy storage element 120. For example, the timing logic 160 may enable the switching elements 130, 140, while leaving the switching element 150 disabled, to provide a path that couples a voltage applied at a high voltage (HV) terminal 170 through the load circuit 110 to a second terminal 175 of the high voltage power supply (e.g., ground), thereby powering the load circuit 110, i.e., a load powering phase. For purposes of the following description, the second terminal 175 of the power supply is assumed to be ground. Of course, as will be appreciated by those of ordinary skill in the art, other architectures may be used where the second terminal 175 is coupled to a voltage other than ground. Also, as will be appreciated by those of ordinary skill in the art, the load circuit 110 may include switching circuitry that allows load elements within the load circuit to be connected and disconnected from the HV terminal 170.

During a different phase in the switching cycle (e.g., prior to or after powering the load circuit 110), the timing logic 160 may couple the load circuit 110 to the energy storage element 120 to allow energy transfer and charging of the energy storage element 120, i.e., a bootstrap charging phase. For example, the timing logic 160 may disable the switching element 140, while leaving the switching element 130 enabled, and enable the switching element 150 (e.g., actively if the switching element 150 is a transistor and passively if the switching element 150 is a diode) to include the energy storage element 120 in the path between the load circuit 110 and ground, thereby charging the energy storage element 120.

After the energy storage element 120 is charged, the timing logic 160 turns off the switching element 130, allowing the power converter 100 to enter a phase in which the load circuit 110 operates in isolation from the high voltage supply, i.e., a passive phase. Of course, the load circuit 110 may contain elements that continue to transfer power among various load elements or may perform other operations during the passive phase, so the term passive phase is meant to refer to that portion of the switching cycle that occurs when components of power converter 100 are essentially isolated from the load circuit 110. For ease of illustration, the connections between elements of the load circuit 110 and other elements of the power converter 100 are not illustrated, as various types of connections may be used. The load circuit 110 also may include connections to terminals other than those shown, such as the ground terminal 175 for example. The architecture may be a boost, flyback, buck, forward, Cuk, SEPIC, etc., as are known to those of ordinary skill in the art.

The operation of the power converter 100 is further illustrated in FIGS. 2-6 which illustrate various examples for implementing the timing logic 160. The reference numerals of elements corresponding to FIG. 1 are not changed.

Figure 2:
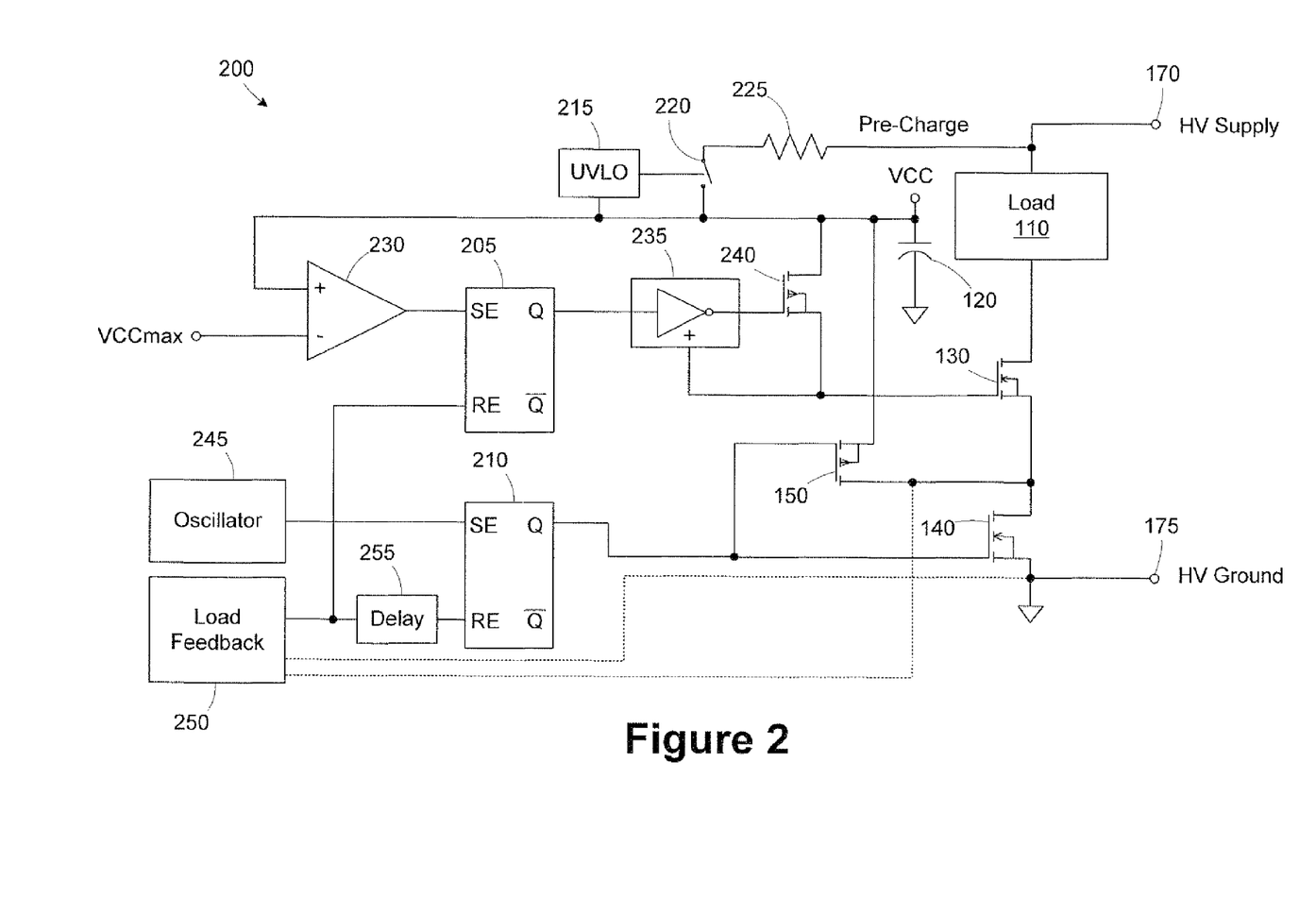
FIGS. 2-5 are circuit diagrams of different embodiments of power converters capable of implementing the functionality of the power converter of FIG. 1 with respect to timing control.

Turning to FIG. 2, one embodiment of a power converter 200 is illustrated. The power converter 200 includes latches 205, 210 for controlling the states of the switching elements 130, 140, 150. Note that the switching element 150 is implemented using a p-type enhancement mode transistor, and the switching elements 130, 140 are implemented using n-type enhancement mode transistors. The transistor 130 is a high-voltage diffused metal oxide semiconductor (DMOS) transistor, while the other transistors in the power converter 200 are integrated low-voltage transistors from a complimentary metal oxide semiconductor (CMOS) integrated circuit process. An undervoltage lockout (UVLO) 215 is provided for disabling the circuitry of the timing logic 160 until the energy storage element 120 has been charged to a minimum operating voltage.

The UVLO 215 controls the state of a switch 220 that is initially closed prior to start-up. When a voltage is applied to the HV supply terminal 170, the switch 220 allows the energy storage element 120 to charge through a resistor 225 until it reaches the threshold of the UVLO 215 (i.e., the start-up period), after which the switch 220 is opened. The time required to initially charge the energy storage element 120 is determined by the time constant resulting from the magnitudes of the resistance for the resistor 225 and the capacitance of the load circuit 110. Because, current flows through the resistor 225 only during start-up, its resistance can be set at a relatively low value to provide a short time constant, thus providing a quick start-up without sacrificing efficiency.

In another embodiment, the power converter 200 may be implemented with the switch 220 replaced by a short circuit. In such a case, a small current always flows through the resistor 225, resulting in a decrease in circuit efficiency. The resistance value of the resistor 225 may be increased to reduce the amount of efficiency loss, but this increase results in an increase in the time constant and a lengthened start-up time. Hence, there is a tradeoff between efficiency and start-up time. An advantage of the embodiment without the switch 220 is that it may be implemented using a lower voltage fabrication process. In the embodiment of FIG. 2, the switch 220 must be fabricated using a process compatible with the high voltage at the terminal 170 (e.g., 500V), while in the embodiment without the switch 220, a lower voltage process may be used (e.g., 12V).

After the initial charging of the energy storage element 120 during the start-up period, the UVLO 215 enables the power converter 200. In this initial state, the transistor 130 is enabled and the switching cycle is controlled by an oscillator 245. The output signal from the oscillator 245 sets a latch 210, which disables the transistor 150 and enables the transistor 140, thereby establishing a path through the load circuit 110 to ground via the transistors 130, 140 and initiating the load powering phase. Power is supplied to the load circuit 110 until a signal is generated by a load feedback unit 250.

The feedback function in a switched mode power converter controls an output parameter, such as current, voltage, or power, by adjusting the switching duty cycle. Duty cycle is the fraction of the switching cycle during which power is exchanged between the load circuit 110 and HV terminals 170, 175. The output parameter is compared to a reference value, and the duty cycle is either lengthened to increase output power or shortened to decrease output power so that the output parameter converges on a reference value. For example, in voltage regulators, the controlled output parameter is voltage. In constant current LED drivers, the output parameter is current. In a heater, the output parameter would be power or temperature. Hence, the particular feedback parameter employed by the load feedback unit 250 may vary depending on the intended application for the power converter 200. Also, the criterion for signal generation by the load feedback unit 250 may vary under different operating conditions. For example, a soft-start function may use a lower reference value for the controlled output parameter initially, or the output signal from the load feedback unit 250 may be generated after a fixed delay following the start-up period.

In one embodiment, the transistor 140 may be used to detect load current. During the load powering phase (i.e., while the transistor 140 is in the on state), it can serve as a resistor that converts load current to a voltage that can be sensed by the load feedback unit 250 (i.e., as shown in phantom in FIG. 2) as a load feedback parameter and/or for over-current protection. Although this technique is not specifically illustrated in FIGS. 3-5, it may also be employed to sense load current in these other embodiments.

When the load feedback unit 250 signals that the appropriate value of duty cycle for a given load parameter is reached, the latch 205 is reset, thereby ending the load powering phase and initiating the bootstrap charging phase. The output of the latch 205 goes low, resulting in the buffer 235 going high and turning off the transistor 240, allowing the gate of the transistor 130 to float above its source and remain on (i.e., charge stored on the gate of the transistor 130 maintains the on condition even though the gate is no longer actively powered). Other techniques (e.g., capacitive gate drive bootstrapping) for maintaining the on condition in transistor 130 during the bootstrap charging phase will be apparent to those of ordinary skill in the art. The latch 210 is also reset by the load feedback unit 250 after a small delay induced by a delay element 255 to avoid simultaneous conduction of the transistors 150, 240. When the latch 210 goes low, the transistor 150 is enabled and the transistor 140 is disabled, thereby providing a path connecting the load circuit 110 to the energy storage element 120 through the transistors 130, 150 to charge the energy storage element 120.

When the voltage at the energy storage element 120 reaches VCCmax, the output of comparator 230 goes high, and the level shift buffer 235 enables a p-type enhancement mode transistor 240 to connect the gate of the transistor 130 to VCC, which is the same as the voltage at its source, thereby turning it off and ending the bootstrap charging phase. After the transistor 130 is turned off, the load circuit 110 operates in isolation during the passive phase. The switching cycle (i.e., load powering phase, bootstrap charging phase, passive phase) repeats responsive to the next pulse of the oscillator 245.

Figure 3:
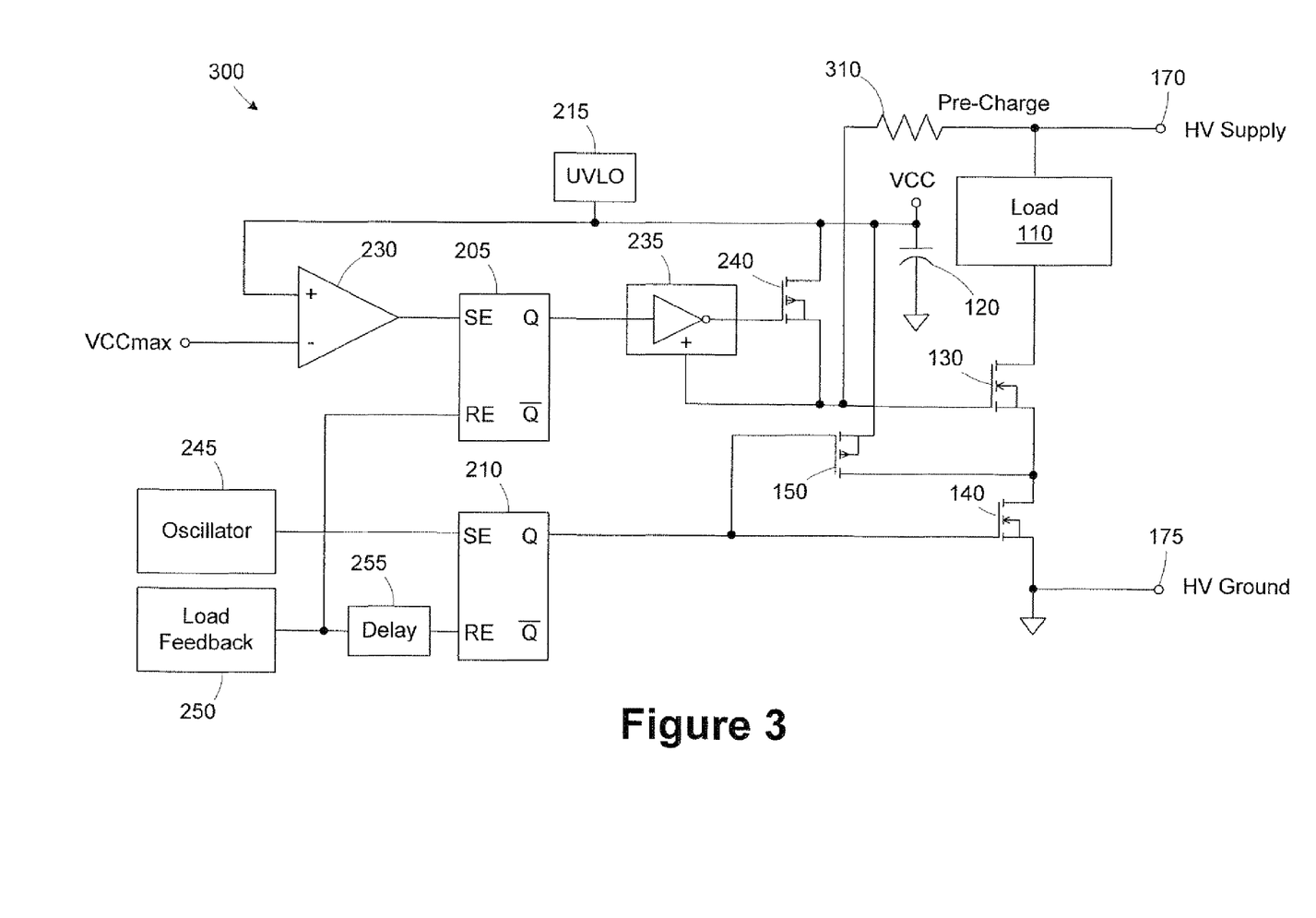

Turning now to FIG. 3, another power conversion embodiment is shown in the power converter 300. The power converter 300 includes a resistor 310 that is coupled between the high voltage terminal 170 and the gate of transistor 130. When power is provided to the high voltage terminal 170, the resistor 310 charges the gate and turns the transistor 130 on. A path from or through the load circuit 110 and the transistors 130, 150 is provided to charge the energy storage element 120. The UVLO 215 enables the circuit when the voltage exceeds its predetermined threshold and starts the oscillator 245. The power converter 300 then operates in the same manner as the power converter 200 of FIG. 2, hence, the reference numerals for the similar components are not changed. Because the resistor 310 only needs to charge the gate of the transistor 130 to enable charging of the energy storage element 120 to generate VCC during the start-up period, the start-up time of the power converter is relatively small even if resistor 310 is very high in value. Thus, the current constantly flowing through the resistor 310 to the gate node of transistor 130 is small, so there is little trade-off between start-up time and efficiency.

The power converters 200, 300 of FIGS. 2 and 3 employ enhancement mode DMOS transistors for the switching element 130. Such transistors are widely available in many different sizes and voltage ratings. However, the timing logic 160 for these transistors is more complicated, and the CMOS operating speed is reduced due to the need for the level shifting buffer 235.

Figure 4:
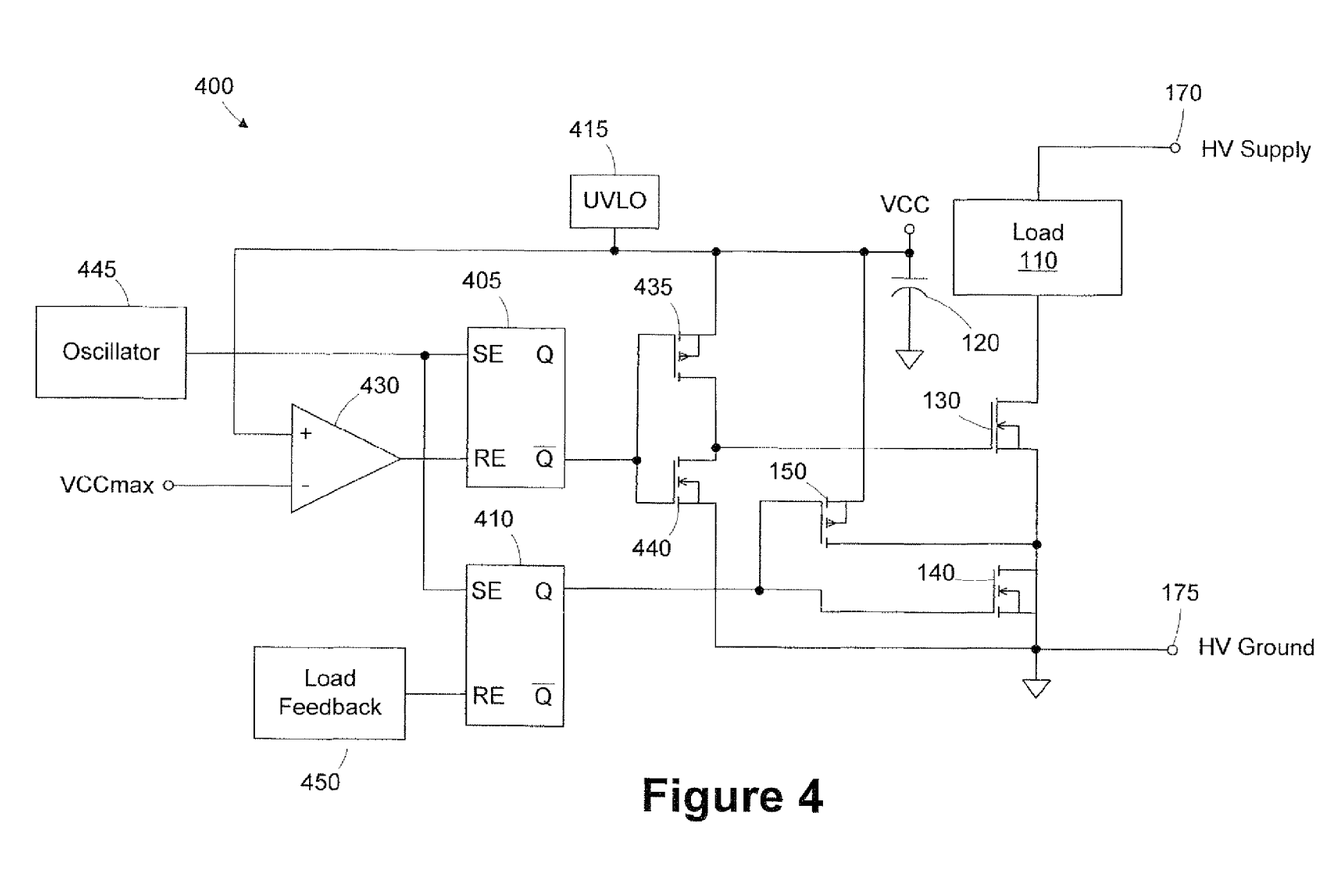

FIG. 4 illustrates a power converter 400 employing a depletion mode DMOS transistor as the switching element 130. The use of a depletion mode transistor 130 allows the power converter 400 to be fabricated using a lower voltage process (e.g., 3.3V) and allows higher speed operation. The power converter 400 includes latches 405, 410, an UVLO 415, a comparator 430, transistors 435, 440, an oscillator 445, and a load feedback unit 450. The UVLO 415, comparator 430, and load feedback unit 450 operate as described above.

When power is applied to the high voltage terminal 170 to initiate the start-up period, the transistor 130 is in an on state because it is a depletion mode device. The transistor 150 is also conducting, either passively through the body diode or actively after VCC reaches a sufficient voltage level, thereby creating a path from the load circuit 110 through the transistors 130, 150, to the energy storage element 120 to allow charging. When VCCmax is reached, the comparator 430 resets the latch 405 causing its inverted output to go high, which turns on the transistor 440, turns off the transistor 435, and grounds the gate of the transistor 130. The source of the transistor 130 is at VCC, because the transistor 150 is also conducting. Hence, the transistor 130 turns off if it is chosen such that its threshold voltage magnitude is below the magnitude of VCC. This ends the start-up period.

The oscillator 445 provides a pulse to start the load powering phase, which sets the latches 405, 410. The latch 405 turns the transistor 435 on and the transistor 440 off. The transistor 435 connects the gate of the transistor 130 to VCC. The latch 410 turns the transistor 140 on, creating a path from the high voltage terminal 170, through the load circuit 110 to ground via the transistors 130, 140. The load feedback unit 450 indicates when the appropriate value of duty cycle for a given load parameter is reached and resets the latch 410. The latch 410 turns off the transistor 140 and turns on the transistor 150 to create a path from the load circuit 110 to the energy storage element 120 to start the bootstrap charging phase.

When the comparator 430 determines that VCCmax is reached, it resets the latch 405 to turn off the transistor 130, as described above, to start the passive phase. The switching cycle (i.e., load powering phase, bootstrap charging phase, passive phase) repeats responsive to the next pulse of the oscillator 445.

Figure 5:
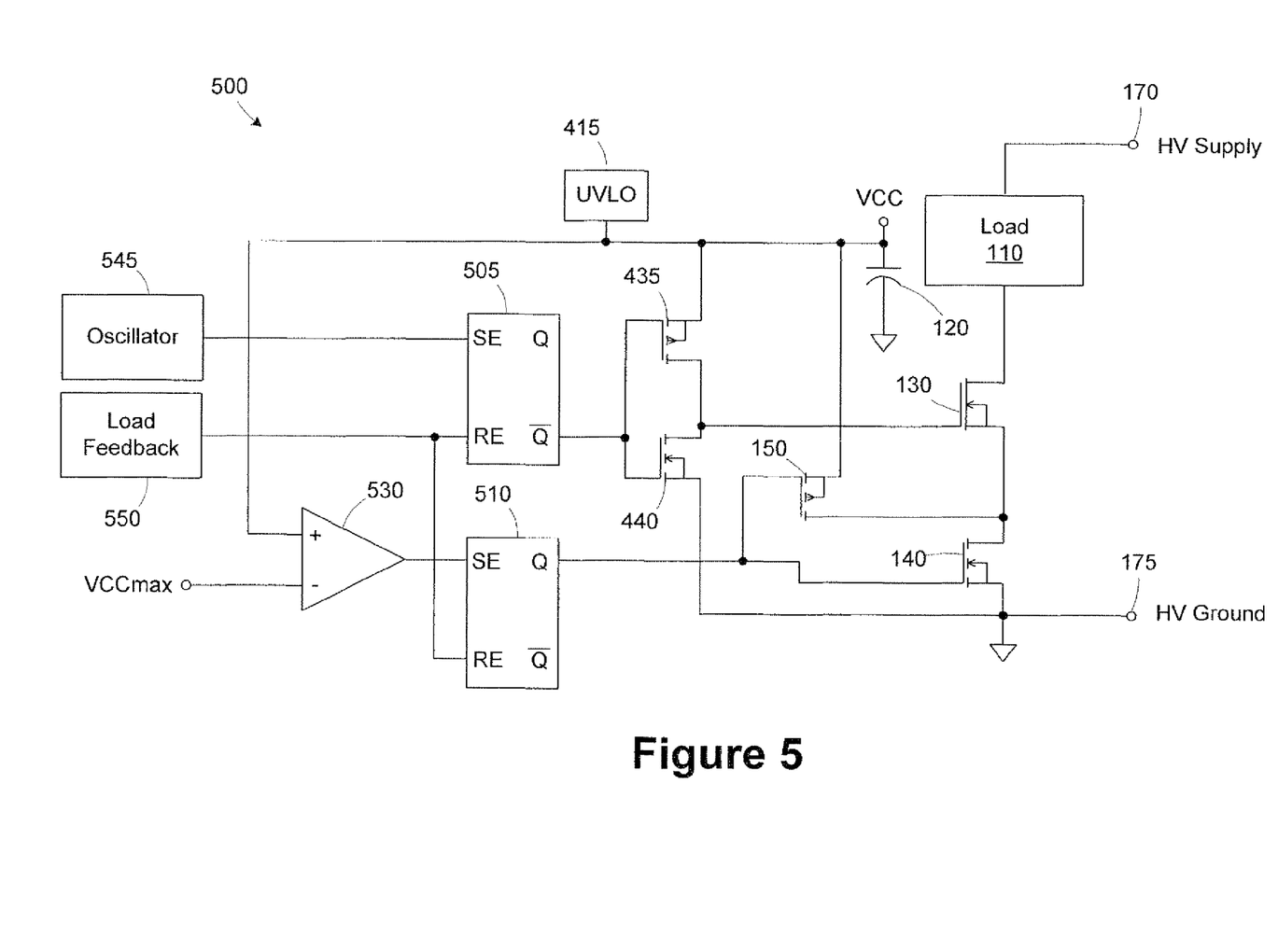

The power converters 200, 300, 400 illustrate the bootstrap charging phase as occurring after the load powering phase in the cycle initiated by the oscillator. The application of the present subject matter is not so limited. To that end, FIG. 5 illustrates another embodiment of a power converter 500 that executes the bootstrap charging phase prior to the load powering phase. The power converter 500 is similar in operation to the power converter 400 with some modification to the timing. Those of ordinary skill in the art will appreciate that the timing logic 160 of the power converters 200, 300 may also be altered to provide a different phase order.

Similar to the power converter 400, when power is applied to the high voltage terminal 170 to begin the start-up period, the transistor 130 is in an on state, because it is a depletion mode device. The transistor 150 is also conducting, either passively through the body diode or actively after VCC reaches sufficient voltage, thereby creating a path from the load circuit 110 through the transistors 130, 150, to the energy storage element 120 to allow charging during the bootstrap charging phase. When VCCmax is reached, the comparator 530 sets the latch 510, which turns the transistor 140 on and the transistor 150 off. This arrangement provides a path from the high voltage terminal 170 through the load circuit 110 to ground via the transistors 130, 140 initiating the load powering phase. The load feedback unit 550 resets the latches 505, 510. The latch 505 grounds the gate of the transistor 130. The latch 510 turns the transistor 140 off and the transistor 150 on bringing the source of the transistor 130 to VCC while its gate is grounded, thereby turning the transistor 130 off, which initiates the passive phase.

The switching cycle starts when the oscillator 545 sets the latch 505. The latch enables the transistor 435, which couples the gate of the transistor 130 to VCC and turns it on. The latch 510 is in a reset state at the end of the passive phase, so the transistor 140 is off and the transistor 150 is on, coupling the load circuit 110 to the energy storage element 120 to begin the bootstrap charging phase. When VCC reaches VCCmax, the comparator 530 sets the latch 510, which turns off the transistor 150 and turns on the transistor 140 to initiate the load powering phase again, followed again by the passive phase. The switching cycle (i.e., bootstrap charging phase, load powering phase, passive phase) repeats responsive to pulses from the oscillator 545.

The power converters 100, 200, 300, 400, 500 described above provide efficient and responsive power conversion that may be adapted to a variety of applications. The disclosed bootstrap invention is efficient because it operates in switched mode, i.e., switching elements dissipate very little power because they drop very little voltage when conducting significant current, and conduct very little current when dropping significant voltage. The power converters 100, 200, 300, 400, 500 may be fabricated using a variety of fabrication processes designed for different voltage conditions. As shown in FIGS. 2-5, various techniques may be provided for accomplishing the functions of the timing logic 160 shown in FIG. 1 to address these performance and fabrication goals. Many other techniques are available, including those, for example, that operate at fixed duty cycle and employ no load feedback. Also, though the disclosed power converters describe the generation of a bootstrap power supply for supplying power to control circuitry, the technique is applicable to the generation of any low-voltage power supply for any purpose.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

I claim:

1. A power converter controller operable to control power provided to a load circuit coupled between a first voltage supply terminal and a first switching element by controlling the first switching element and to control power provided to an energy storage element coupled to the first switching element, the energy storage element being operable to provide a power supply, comprising:
   a first control terminal for coupling to a control input of the first switching element;
   a first load terminal coupled to the first switching element and the charge storing element;
   a second switching element coupled between the first load terminal and a second voltage supply terminal; and
   timing logic operable to selectively provide a control signal at the first control terminal to control the first switching element and to selectively control the second switching element to supply power to the load circuit during a load powering phase by enabling the first and second switching elements, charge the energy storage element during a bootstrap charging phase by enabling the first switching element and disabling the second switching element, and allowing the load circuit to operate in isolation during a passive phase by disabling at least the first switching element, wherein the timing logic comprises a first latch coupled to enable the first switching element and a second latch operable to enable the second switching element.

2. The power converter of claim 1, further comprising a third switching element coupled between the energy storage element and the node.

3. The power converter of claim 2, wherein the third switching element comprises a diode.

4. The power converter of claim 2, wherein the timing logic is operable to enable the third switching element during the bootstrap charging phase.

5. The power converter of claim 1, wherein the first switching element comprises an enhancement mode transistor.

6. The power converter of claim 1, wherein the first switching element comprises a depletion mode transistor.

7. The power converter of claim 1, wherein the timing logic implements the load powering phase after the bootstrap charging phase during a switching cycle of the power converter.

8. The power converter of claim 1, wherein the timing logic comprises a pre-charge circuit for charging the energy storage element during a start-up period of the power converter.

9. The power converter of claim 8, wherein the pre-charge circuit includes a resistor coupled between the first voltage supply terminal and the energy storage element.

10. The power converter of claim 9, further comprising:
    a switch coupled between the resistor and the energy storage element, the switch being closed when the start-up period initiates; and
    an undervoltage lockout operable to open the switch responsive to a voltage on the energy storage element exceeding a first predetermined threshold.

11. The power converter of claim 1, wherein the timing logic comprises a pre-charge circuit including a resistor coupled between the first voltage supply terminal and a control terminal of the first switching element.

12. The power converter of claim 1, further comprising a load feedback unit operable to reset at least one of the first or second latches responsive to a load feedback parameter matching a predetermined threshold to initiate the bootstrap charging phase, wherein the load feedback unit is operable to determine current flowing through the second switching element to generate the load feedback parameter.

13. The power converter of claim 1, wherein the first switching element comprises an enhancement mode transistor, and the timing logic further comprises:
    an oscillator operable to set the second latch to initiate the load powering phase;
    a load feedback unit operable to reset the first and second latches responsive to a load feedback parameter matching a predetermined threshold to initiate the bootstrap charging phase; and
    a comparator operable to set the first latch responsive to a voltage on the energy storage element exceeding a first predetermined threshold to terminate the bootstrap charging phase and disable the first switching element to initiate the passive phase.

14. The power converter of claim 1, wherein the first switching element comprises a depletion mode transistor, and the timing logic further comprises:
    an oscillator operable to set the first and second latches to initiate the load powering phase;
    a load feedback element operable to reset the second latch responsive to a load feedback parameter matching a predetermined threshold to initiate the bootstrap charging phase; and
    a comparator operable to reset the first latch responsive to a voltage on the energy storage element exceeding a first predetermined threshold to terminate the bootstrap charging phase and disable the first switching element to initiate the passive phase.

15. The power converter of claim 1, wherein the first switching element comprises a depletion mode transistor, and the timing logic further comprises:
    an oscillator operable to set the first latch and initiate the bootstrap charging phase;
    a comparator operable to set the second latch responsive to a voltage on the energy storage element exceeding a first predetermined threshold to terminate the bootstrap charging phase and enable the second switching element to initiate the load powering phase; and a load feedback element operable to reset the first and second latches responsive to a load feedback parameter matching a predetermined threshold to disable the first and second switching elements and initiate the passive phase.

16. The power converter of claim 1, wherein the second voltage supply terminal comprises a ground terminal.

17. The power converter of claim 1, wherein the load circuit includes one of an inductor, a transformer, or a piezoelectric device.

18. The power converter of claim 1, wherein the energy storage element comprises one of a capacitor or a battery.

19. A power converter controller operable to control power provided to a load circuit coupled between a first voltage supply terminal and a first switching element by controlling the first switching element and to control power provided to an energy storage element coupled to the first switching element, the energy storage element being operable to provide a power supply, comprising:
   a first control terminal for coupling to a control input of the first switching element;
   a first load terminal coupled to the first switching element and the charge storing element;
   a second switching element coupled between the first load terminal and a second voltage supply terminal;
   timing logic operable to selectively provide a control signal at the first control terminal to control the first switching element and to selectively control the second switching element to supply power to the load circuit during a load powering phase by enabling the first and second switching elements, charge the energy storage element during a bootstrap charging phase by enabling the first switching element and disabling the second switching element, and allowing the load circuit to operate in isolation during a passive phase by disabling at least the first switching element, wherein the timing logic comprises a pre-charge circuit for charging the energy storage element during a start-up period of the power converter, wherein the pre-charge circuit includes a resistor coupled between the first voltage supply terminal and the energy storage element;
   a switch coupled between the resistor and the energy storage element, the switch being closed when the start-up period initiates; and
   an undervoltage lockout operable to open the switch responsive to a voltage on the energy storage element exceeding a first predetermined threshold.

20. The power converter of claim 19, further comprising a third switching element coupled between the energy storage element and the node.

21. The power converter of claim 20, wherein the third switching element comprises a diode.

22. The power converter of claim 20, wherein the timing logic is operable to enable the third switching element during the bootstrap charging phase.

23. The power converter of claim 19, wherein the first switching element comprises an enhancement mode transistor.

24. The power converter of claim 19, wherein the first switching element comprises a depletion mode transistor.

25. The power converter of claim 19, wherein the timing logic implements the load powering phase after the bootstrap charging phase during a switching cycle of the power converter.

26. A power converter controller operable to control power provided to a load circuit coupled between a first voltage supply terminal and a first switching element by controlling the first switching element and to control power provided to an energy storage element coupled to the first switching element, the energy storage element being operable to provide a power supply, comprising:
   a first control terminal for coupling to a control input of the first switching element;
   a first load terminal coupled to the first switching element and the charge storing element;
   a second switching element coupled between the first load terminal and a second voltage supply terminal; and
   timing logic operable to selectively provide a control signal at the first control terminal to control the first switching element and to selectively control the second switching element to supply power to the load circuit during a load powering phase by enabling the first and second switching elements, charge the energy storage element during a bootstrap charging phase by enabling the first switching element and disabling the second switching element, and allowing the load circuit to operate in isolation during a passive phase by disabling at least the first switching element, wherein the timing logic comprises a pre-charge circuit including a resistor coupled between the first voltage supply terminal and a control terminal of the first switching element.

27. The power converter of claim 26, further comprising a third switching element coupled between the energy storage element and the node.

28. The power converter of claim 27, wherein the third switching element comprises a diode.

29. The power converter of claim 27, wherein the timing logic is operable to enable the third switching element during the bootstrap charging phase.

30. The power converter of claim 26, wherein the first switching element comprises an enhancement mode transistor.

31. The power converter of claim 26, wherein the first switching element comprises a depletion mode transistor.

32. The power converter of claim 26, wherein the timing logic implements the load powering phase after the bootstrap charging phase during a switching cycle of the power converter.

* * * * *